United States Patent
Gortz et al.

(10) Patent No.: US 6,477,498 B1
(45) Date of Patent: *Nov. 5, 2002

(54) METHOD FOR ASSIGNMENT OF A SELECTABLE OPTION TO AN ACTUATING MEANS

(75) Inventors: Udo Gortz; Wolfgang Theimer, both of Bochum (DE)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/327,390

(22) Filed: Jun. 7, 1999

(30) Foreign Application Priority Data

Jun. 9, 1998 (DE) .......................................... 198 25 760

(51) Int. Cl.[7] .............................................. G01L 21/00
(52) U.S. Cl. ...................................................... 704/275
(58) Field of Search ................................ 704/270, 275, 704/256; 379/88

(56) References Cited

U.S. PATENT DOCUMENTS

| | | | | | |
|---|---|---|---|---|---|
| 4,648,062 A | * | 3/1987 | Johnson et al. | ............. | 364/900 |
| 4,797,924 A | * | 1/1989 | Schnars et al. | ................ | 381/43 |
| 4,804,328 A | * | 2/1989 | Barrabee | ...................... | 434/308 |
| 5,479,476 A | | 12/1995 | Finke-Anlauff | ............... | 379/58 |
| 5,479,491 A | * | 12/1995 | Garcia et al. | .................. | 379/88 |
| 5,602,597 A | * | 2/1997 | Bertram | ...................... | 348/565 |
| 5,640,485 A | | 6/1997 | Ranta | .......................... | 395/2.6 |
| 5,812,954 A | | 9/1998 | Henriksson | ................... | 455/550 |
| 5,819,175 A | | 10/1998 | Niemi | .......................... | 455/418 |
| 5,864,603 A | | 1/1999 | Haavisto et al. | ............... | 379/88 |
| 5,887,264 A | | 3/1999 | Kohler | ......................... | 455/461 |
| 5,892,475 A | | 4/1999 | Palatsi | .......................... | 345/352 |
| 6,073,033 A | * | 6/2000 | Campo | ......................... | 455/566 |
| 6,160,877 A | * | 12/2000 | Tatchell et al. | .............. | 379/197 |
| 6,188,986 B1 | * | 2/2001 | Matulich et al. | ............. | 704/275 |
| 6,353,661 B1 | * | 3/2002 | Bailey, III | ................ | 379/93.25 |

FOREIGN PATENT DOCUMENTS

| | | |
|---|---|---|
| DE | 38 37 385 C2 | 5/1989 |
| DE | 196 08 869 C2 | 9/1997 |
| EP | 0 078 016 B1 | 5/1983 |

OTHER PUBLICATIONS

Prior Art Disclosure Statement.

* cited by examiner

*Primary Examiner*—Susan McFadden
(74) *Attorney, Agent, or Firm*—Perman & Green, LLP

(57) ABSTRACT

Method for assignment of a selectable option to an actuating means in which a voice-aided control device is activated in order to assign to the actuating means a selectable option for a selection command. In order to assist a user in the selection of an option to be assigned to the actuating means, the invention provides that after activation of the voice-aided control device, the selectable options which are currently available can be announced.

11 Claims, 2 Drawing Sheets

METHOD FOR ASSIGNMENT OF A SELECTABLE OPTION TO AN ACTUATING MEANS

Figure 1:
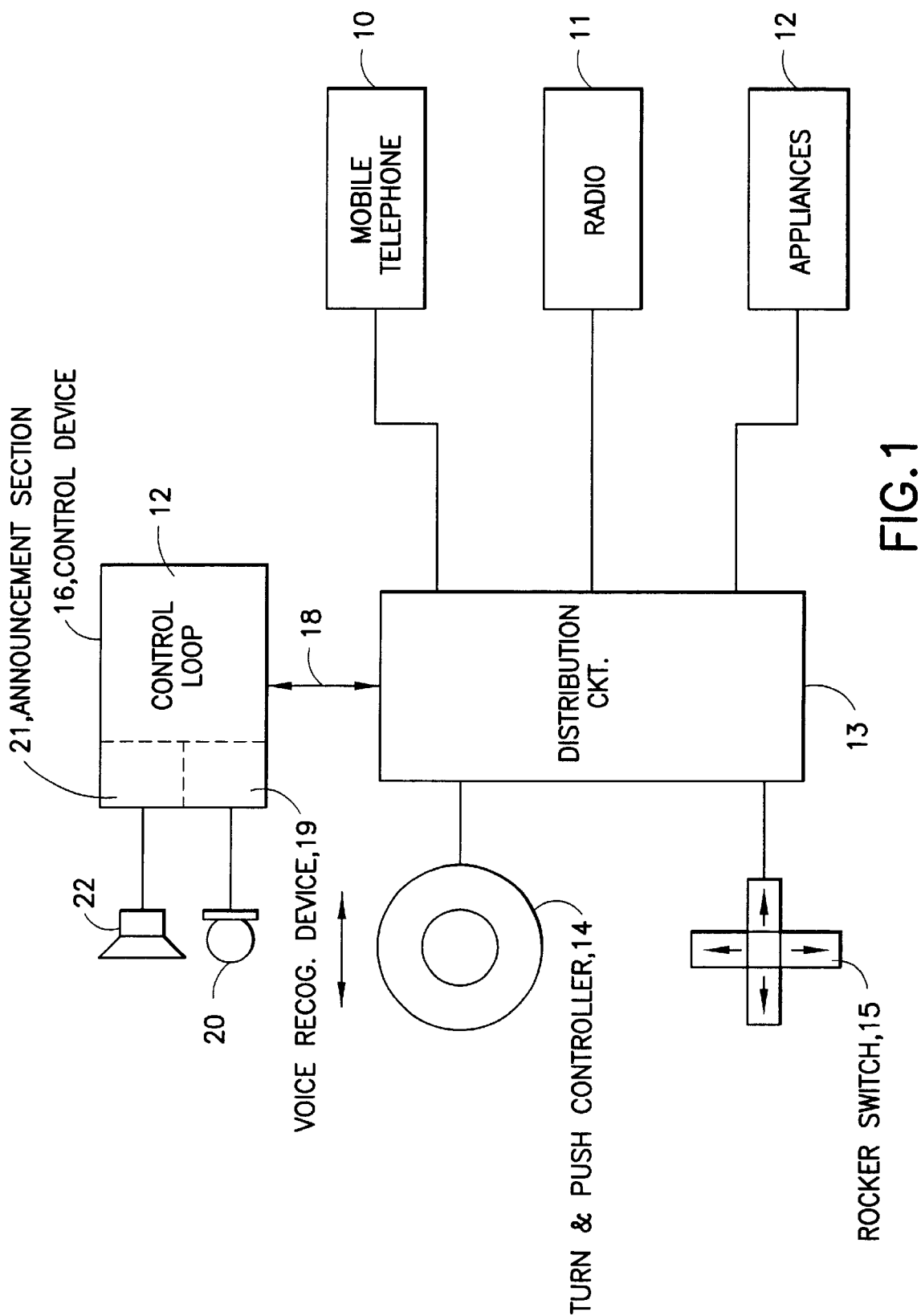

The invention relates to a method for assignment of a selectable option to an actuating means, according to the precharacterizing clause of claim 1.

In systems having one or more electrical or electronic appliances, in which more setting or control functions are provided than there are actuating means for this purpose, one actuating means is normally assigned two or more functions which can then be carried out by means of an appropriate operating modality. If, for example in the case of a motor vehicle radio, only one rocker switch or jog dial is provided to adjust the loudness and the balance, then an assignment button is normally provided in order to adjust the two variables, so that the loudness is adjusted when the rocker controller is pressed once, and the balance is adjusted when it is pressed twice.

A problematic feature of this type of assignment of a control function to an actuating means arises when a large number of control functions have to be assigned to one or a small number of actuating means.

In the case of one known control system (DE 196 08 869 C2), a voice control device is provided, using which a control function which can be selected from a large number of control functions can be assigned to an operating means which can be controlled manually. To this end, the voice control device is activated by pressing the operating means so that the user can select the desired control function by means of an appropriate predefined voice command, and the desired control function is then assigned to the operating means by the voice control device. If the operating means is then operated by the user, then the signals produced by the operating means are passed via the voice control device, for example via a data bus, to the appropriate appliance that is to be controlled. Feedback relating to the selected control function and the appropriately set function values may in this case be provided by touch, visually or audibly via voice output means.

Furthermore, a voice control system is already known (EP 0 078 016 B1) in which an operating button can be assigned a control function by means of a voice command, once it has been pressed. In this case, the operating button is connected via appropriate switch means to an appliance which is to be controlled, in order to carry out the selected control function. Once the setting or adjustment process has been completed, the operating button ceases to have the assigned operating function once a predetermined time has passed.

The invention is based on the object of providing a further method for assignment of a selectable option to an actuating means, which method, in particular, makes it easier for a user to select an option to be assigned, and thus simplifies the process of controlling a corresponding system having a plurality of electrical or electronic appliances, via only a small number of actuating means.

This object is achieved by the method according to claim 1. Advantageous refinements of the invention are described in the dependent claims.

The invention thus provides, for a method of the type mentioned initially, that, once the voice-aided control device has been activated, only those selectable options which are currently available can be announced. The use of the method according to the invention in a system having a plurality of electrical or electronic appliances makes it considerably easier for the user to control the various appliances, since he or she has the option, by virtue of the announcement of the respective selectable options (that is to say, for example, the selectable appliances) or, as soon as an appliance is selected, the announcement of the available functions for whose selection one available function can be supported. Since only the respective currently available selection options are announced in the announcement, the announcement can be kept short and clear.

A first refinement of the invention provides for the capability to activate the voice-aided control device by means of a voice command which starts the continuous announcement of those selectable options which are currently available, in which case a selectable option which is currently available is selected by means of a selection voice command, which is spoken immediately after the announcement of the desired option. In this way, a specific control function can be assigned to an actuating means just by voice commands.

However, in order to ensure reliable assignment of a control function to an actuating means even in a noisy environment, it is possible, in addition to or instead of the option for making the selection by a voice command, to provide for a selectable option which is currently available to be selected by means of an actuating signal from the relevant actuating means, which is operated immediately after the announcement of the desired option.

In order to give a practised user the option of carrying out assignment of a control function to the actuating means independently of the announcement, it is expedient if a selectable option which is currently available can be selected by speaking a designation which is assigned to the desired option, at any time, independently of the announcement of the selectable options which are currently available.

Another refinement of the invention is distinguished by a selectable option which is currently available being selected by successive operation of the relevant actuating means, in which case, once the voice-aided control device has been activated by a first operation of the actuating means, each further operation of the actuating means is assessed as selection of the respective next selectable option. In this case, it is advantageous if, after each operation of the actuating means, the option selected by this operation is announced.

In order to make it possible to dispense with the inputting of a special assignment signal in this case, it is particularly expedient for a selected option to be assigned to the actuating means once a predetermined time has passed since the last operation of the actuating means.

One advantageous development of the invention is distinguished in that once an option has been assigned to an actuating means, this assignment can be cancelled by operating the actuating means again or by an appropriate voice command. This makes it possible to correct an incorrectly made assignment of a control function to an actuating means.

Another advantageous correction option is provided if, once an option has been assigned to an actuating means, this assignment can be changed by operating the actuating means again and simultaneously speaking a designation which is assigned to another desired selectable option which is currently available.

Figure 2:
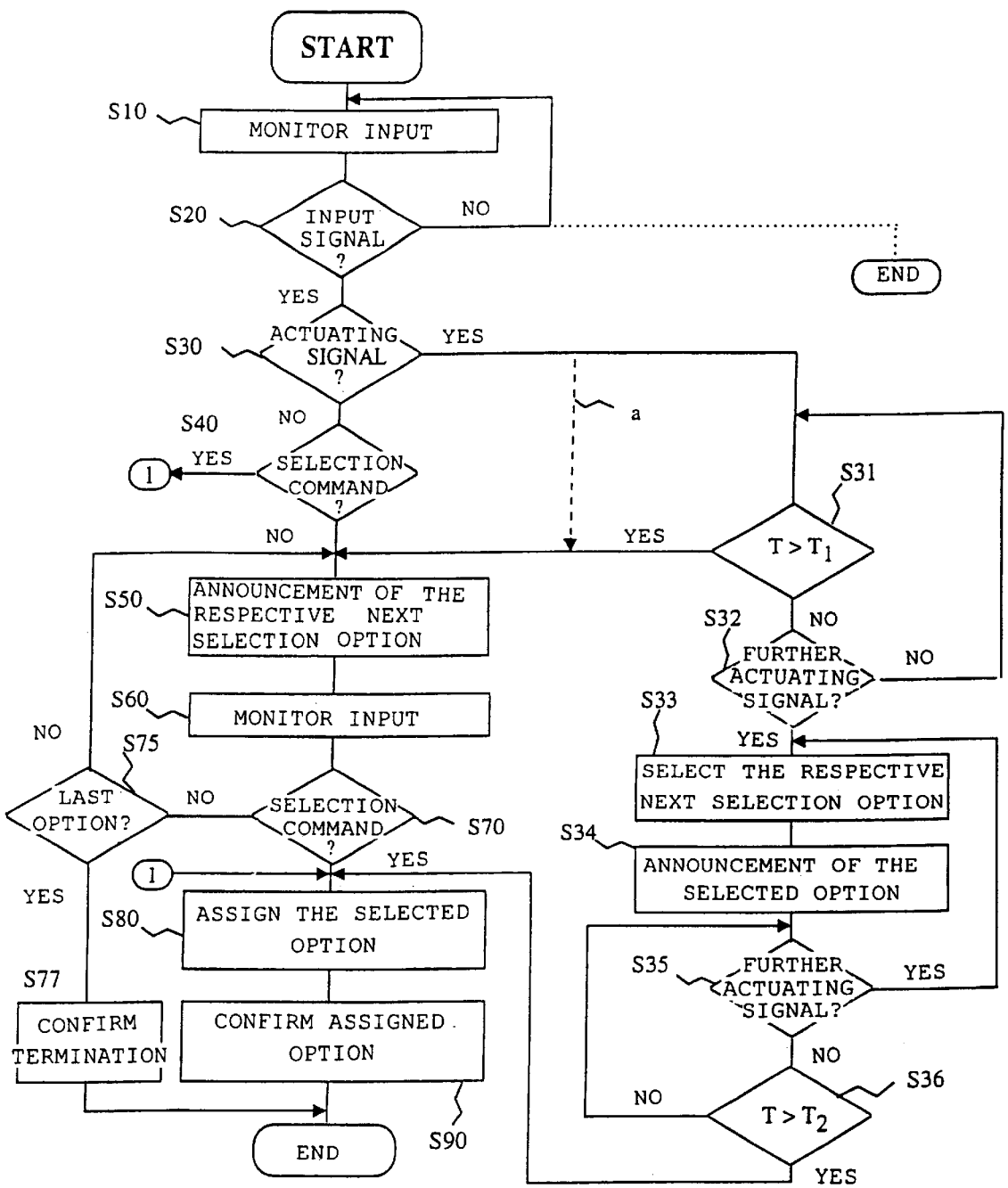

The invention will be explained in more detail in the following text, by way of example using the drawing, in which:

FIG. 1 shows a simplified schematic block diagram of a system of electrical or electronic appliances with a voice-aided control device, and FIG. 2 shows a schematic flow chart of an exemplary embodiment of the method according to the invention.

As is shown schematically in FIG. 1, a multiplicity of electrical or electronic appliances, such as a mobile telephone 10, a radio 11, and further appliances 12 such as a navigation unit, an on-board computer or the like, are connected via a controllable distribution circuit 13 to one or more actuating means, such as a turn-and-push controller 14, a rocker switch 15 or a jog dial or the like. The distribution circuit 13 is controlled by a voice-aided control device 16 so that it is possible to assign one of the appliances 10, 11, 12, as well as a corresponding control function, optionally successively to each actuating means 14, 15 or simultaneously to various actuating means 13, 14. The voice-aided control device 16 comprises a control loop 17 which is connected via a bidirectional line 18 to the distribution circuit 13, a voice recognition device 19 to which a microphone 20 is connected in order to input voice commands, and an announcement section 21, to which a loudspeaker 22 is connected in order to output audible information, in particular in order to announce options which can be assigned to the actuating means 14, 15. The control loop 17 of the voice-aided control device 16 also receives operating signals from the individual actuating means 14, 15, in addition to voice-command signals from the voice recognition device 19.

In order to allow individual appliances 10, 11, 12 to be controlled using one or more of the actuating means 14, 15, it is first of all necessary to assign the appliance to be controlled, that is to say the radio 11 for example, to a selected actuating means, for example the turn-and-push controller 14, in order then to assign a desired control function, for example adjustment of the volume, to the turn-and-push controller 14.

The various options for assigning an electrical or electronic appliance 10, 11, 12 and/or a control function to an actuating means 14, 15 using the method according to the invention will be described in the following text with reference to FIG. 2. In this case, the turn-and-push controller 14 is mentioned largely as being representative of any desired available actuating means.

Once the system has been switched on, the voice-aided control device 16 is activated, and its control loop 17 monitors the inputting of voice commands via the microphone 20 and the voice recognition device 19 and the inputting of operating or actuating signals which are input by operating the actuating means 14, 15 (step S10). It is possible in this case to provide for the actuating means 14, 15 to be operated in a different way than for carrying out an assigned control function, in order to input actuating signals. For example, in the case of the turn-and-push controller 14, pushing may be used to input an actuating signal to carry out the method according to the invention, while turning can be used for parameter adjustment or setting in accordance with an assigned control function. Correspondingly, in the case of the rocker switch 15, an operation which does not occur when carrying out an assigned control function, for example simultaneous operation of opposite rocker parts, can be used for producing an actuating signal.

After this, a check is carried out in step S20 to determine whether an input signal is present. If not, then the monitoring of the input is normally continued in step S10. However, it is also possible to terminate the method here, as is indicated by the dashed line in FIG. 2 and to start it once again after a certain waiting time.

If an input signal is present, then a check is carried out in step S30 to determine whether this signal is an actuating signal supplied from the turn-and-push controller 14.

If this is the case, then it is possible to start immediately, in step S50, with the announcement of the respective next selectable option which is currently available, as is indicated by the dashed line a. However, it is preferable, first of all, to check in step S31 whether the time T since the occurrence of the actuating signal is greater than a predetermined waiting time $T_1$. If this is not the case, then the check is carried out in step S32 to determine whether a further actuating signal has occurred. If this is also not the case, then the system waits for the waiting time $T_1$ in order then, in step S50, to start the announcement of the respective next currently available option.

However, if a further actuating signal was found in step S32, that is to say the turn-and-push controller 14 had been pushed again, then the respective next selection option is in consequence selected in step S33, that is to say the first currently available selection option for the first additional operation. The selected option can then be announced in step S34. However, this announcement option could also be dispensed with so that, immediately after step S33, a check is carried out in step S35 to determine whether another actuating signal is present again. If this is the case, then the next selection option is once again selected in step S33 in order then, after announcing (in step S34) the selection option that has now been selected, step S35 once again confirms whether a new actuating signal is present. If this is not the case, then a check is carried out in step S36 to determine whether a second waiting time $T_2$ has passed. As soon as this is the case, the selected option is assigned to the turn-and-push controller 14, in step S80. This completes the assignment of a selectable option to the turn-and-push controller 14 or to some other actuating means with the aid of the actuating means itself, and possibly with an associated announcement of the respective selected option. However, it is also expedient for the assigned option to be confirmed, in step S90, for example by an appropriate announcement, or visual indication, or both.

In the manner described here, it is possible for a user who is familiar with the handling of the system for a plurality of electrical or electronic appliances to select a desired appliance or a desired control function by successively pushing the turn-and-push controller 14 a number of times.

Thus, for example, if the user wishes to use the turn-and-push controller 14 first of all to select the radio 11, which is the second selectable option among the electrical or electronic appliances, then he pushes the turn-and-push controller 14 three times, the first time to activate the voice-aided control device 16, and the two following times in order to select the radio 11 in accordance with the steps S32, S33, S34, S35 and S36.

However, if the second push on the turn-and-push controller 14 does not take place or does not take place within the waiting time $T_1$, then the announcement of the respective next currently available selection option is started, in step S50. After the announcement of a selection option, the input is then monitored once again in step S60, in order to find out, in step S70, whether a selection command is present.

In this case, it is once again possible to use as a selection command an actuating signal which has been produced by the turn-and-push controller 14 and has been produced by a user by pushing the turn-and-push controller 14 immediately after the announcement of a desired option, in order to select the immediately previously announced option. This allows reliable selection even in a very noisy environment.

However, a voice command, which can be input via the microphone 20 and the voice recognition device 19, is also used as a selection command. In this case, a command word, such as "select" or the like, may be used, for example, as a selection command which is then likewise spoken immediately after the announcement of the desired option.

Furthermore, it is optionally or additionally possible to provide for a desired option to be selected by speaking the designation of this option, that is to say the name of the appliance to be selected or of the desired control function. In this case, the designation can be made either immediately after the appropriate announcement, or else at any desired time while the respective next selection option is still being announced. This provides the unfamiliar user with the option of first of all informing himself or herself of the available options from the announcement, and of then making the desired selection by speaking the designation of the selected control function.

If an option is intended to be selected using an appropriate designation, then it is also possible to use a userdefined designation of the appropriate option, instead of a designation predetermined by the system.

If it is found in step S70 that no selection command is present, then a check is carried out in step S75 to determine whether the last announced option was the last of the selectable options which are currently available. If this is not the case, the continuous announcement is continued in step S50, while the announcement is ended on reaching the last option, and termination of the method is confirmed in step S77. In this case, a check can also be carried out in step S75 to determine whether the available options have been announced for the first, second or n-th time, in order to end the announcement only when all the options have been announced a number of times.

However, if a selection command is present in step S70, then, in step S80, the selected option is once again assigned to the actuating element, the assigned option is confirmed, and the method is then ended.

However, if, in step S30, no actuating signal from the actuating means 14, 15 is present, then a check is carried out in step S40 to determine whether the input signal is a spoken start signal, which then at the same time selects one of the available actuating means, or is a designation (which is used directly as a selection command) of an appliance which is to be assigned to the actuating means 14, 15, or of a control function which is to be assigned to the actuating means. In the latter case, that is to say when a selection command which can be used immediately is present, the method jumps over the continuous announcement in steps S50 to S75, in order to assign the selected option immediately in step S80, and to confirm the assigned option in step S90. Otherwise, the continuous announcement of the currently available options is continued, as described.

If, for example, the radio 11 has been assigned in the described manner to the turn-and-push controller 14, then, after the end of this assignment, the method according to the invention is carried out once again in order now to assign a corresponding control function to the turn-and-push controller 14.

Instead of this two-stage process, it is also possible by the appropriate structuring of the selection options to assign the control function and the corresponding appliance 10, 11, 12 directly to an actuating means 14, 15, by means of a single selection.

After the selection of the desired control function, the user can make the adjustments or settings that he or she desires. After the end of the adjustment or setting process, and once an appropriate waiting time has passed, for example after 5 or 10 seconds, the assignment of the control function is cancelled. The assignment of the control function is also cancelled once this waiting time has passed if the user has not made any adjustments or settings.

In order to avoid the necessity for the waiting time to pass before the assignment is automatically cancelled, if an incorrect selection is made of a control function that is not desired, an appropriate delete function can be provided, with whose aid it is possible to assign a new control function to the actuating means 14, 15 quickly. It is possible, for example, to provide for a renewed operation of the actuating means 14, 15 after the selection of a control function, or an appropriate voice command, for example "delete" or "set different control function" for this purpose. Another option is for the desired control function to be set at the same time that the corresponding actuating means 14, 15 is operated, so that the previous assignment of a control function is cancelled.

If such a delete function is provided, the assignment does not necessarily need to be cancelled automatically, so that the actuating means is always ready to carry out the assigned control function.

The method according to the invention for assignment of a selectable option to an actuating means can also be used when a plurality of identical or different actuating means 14, 15 are provided for a large number of electrical or electronic appliances 10, 11, 12 in a system. In this case, a signal which customizes the corresponding actuating means 14, 15 is expediently used as an input signal to activate the voice-aided control device 16. In the simplest case, this is an actuating signal produced by operating the actuating means. However, it may also be a voice command, such as "left button", ""centre button" or "right button", in order to distinguish, for example, between three turn-and-push controllers 14.

The method according to the invention thus provides a user with the option of deciding himself or herself whether he or she will or will not make use of the option of allowing the process of controlling the system to be assisted by the announcement of the available appliances.

What is claimed is:

1. Method for controlling a system having a voice-aided control device and one distinct means that can be assigned a function selected from two or more available functions, comprising the steps of:

activating the voice-aided control device in order to assign the distinct actuating means a selectable function by means of a selection command;

announcing those selectable functions by the voice-aided control device which are currently available upon activating the voice-aided control device; and entering the selection command to assign the function selected by the selection command to the distinct actuating means so that the selected function can be controlled by operating the actuating means.

2. Method according to claim 1, wherein the voice-aided control device can be activated by means of a voice command which starts the continuous announcement of those selectable options which are currently available.

3. Method according to claim 2, wherein a selectable option which is currently available is selected by means of a selection voice command, which is spoken immediately after the announcement of the desired option.

4. Method according to claim 2, wherein a selectable option which is currently available is selected by means of an actuating signal from the relevant actuating means, which is operated immediately after the announcement of the desired option.

5. Method according to claim 2, wherein a selectable option which is currently available can be selected by speaking a designation, which is assigned to the desired option, at any time, independently of the announcement of the selectable options which are currently available.

6. Method according to claim 1, wherein a selectable option which is currently available is selected by successive operation of the relevant actuating means.

7. Method according to claim 6, wherein once the voice-aided control device has been activated by a first operation of the actuating means, each further operation of the actuating means is assessed as selection of the respective next selectable option.

8. Method according to claim 7, wherein after each operation of the actuating means, the option selected by this operation is announced.

9. Method according to claim 6, wherein a selected option is assigned to the actuating means once a predetermined waiting time has passed since the last operation of the actuating means.

10. Method according to claim 1, wherein once an option has been assigned to an actuating means, this assignment can be cancelled by operating the actuating means again or by an appropriate voice command.

11. Method according to claim 1, wherein once an option has been assigned to an actuating means, this assignment can be changed by operating the actuating means again while at the same time speaking a designation which is assigned to another desired selectable option which is currently available.

* * * * *